United States Patent
Madrid

[11] Patent Number: 5,469,884
[45] Date of Patent: Nov. 28, 1995

[54] CHECK VALVE FOR METER RUN

[75] Inventor: Ronn G. Madrid, Midland, Tex.

[73] Assignee: Durabla Pump Components, Inc., Odessa, Tex.

[21] Appl. No.: 247,204

[22] Filed: May 20, 1994

[51] Int. Cl.⁶ .................................................. F16K 15/02
[52] U.S. Cl. ................. 137/515.7; 137/540; 137/543.19
[58] Field of Search .............................. 137/515.7, 540, 137/543.19

[56] References Cited

U.S. PATENT DOCUMENTS

| | | | |
|---|---|---|---|
| 1,014,178 | 1/1912 | Roberts | 137/543.19 |
| 2,609,175 | 9/1952 | Kokeritz | 251/144 |
| 2,649,277 | 8/1953 | Blackford | 251/144 |
| 2,690,763 | 10/1954 | Seligman | 137/516.11 |
| 2,710,023 | 6/1955 | Blackford et al. | 137/543.19 |
| 2,754,844 | 7/1956 | Blackford | 137/514 |
| 2,904,065 | 9/1959 | Butlin | 137/543.19 X |
| 3,016,913 | 1/1962 | Bargman | 137/312 |
| 3,058,486 | 10/1962 | McDermott et al. | 137/543.19 X |
| 3,109,451 | 11/1963 | Mihalakis | 137/516.11 |
| 3,378,030 | 4/1968 | Cary | 137/543.19 X |
| 3,421,547 | 1/1969 | Aslan | 137/543.19 X |
| 3,633,614 | 1/1972 | Schutz | 137/543.19 |
| 3,830,255 | 8/1974 | Freiheit | 137/543.19 |
| 3,854,496 | 12/1974 | Broszeit | 137/543.19 X |
| 3,895,647 | 7/1975 | Willenbrock et al. | 137/529 |
| 4,354,520 | 10/1982 | Easley, Jr. | 137/543.23 |
| 4,667,697 | 5/1987 | Crawford | 137/543,17 |
| 4,766,930 | 8/1988 | Patti | 137/540 |
| 4,819,689 | 4/1989 | Owsley et al. | 137/512.1 |
| 4,907,616 | 3/1990 | Bergsma | 137/38 |
| 5,193,579 | 3/1993 | Bauer et al. | 137/543.19 X |

*Primary Examiner*—John Rivell
*Attorney, Agent, or Firm*—Marcus L. Bates

[57] ABSTRACT

A fluid check valve for preventing back flow of fluid through a fluid conduit. The check valve is connected in series with a meter run to enable unrestricted normal flow to occur through a passageway in the valve body, and to prevent backflow. A throat forms the entrance into a passageway, and a valve seat is formed behind the throat. A valve cage mounts a valve element for movement within the passageway so that the valve element moves toward and away from the valve seat and during normal flow the valve element is spaced from the valve seat. Should any significant backflow commence, the valve element sealingly engages the valve seat to prevent the occurrence of such backflow. Downstream of the throat and seat there is a wall that enlarges outwardly and radially into a circumferentially extending slot having an outside diameter greater than the diameter of the passageway. The cage has a main central body part to which there is integrally attached a plurality of radially extending legs for attachment into the circumferentially extending locking groove to hold the cage in position within the passageway and to abuttingly engage the valve element.

11 Claims, 4 Drawing Sheets

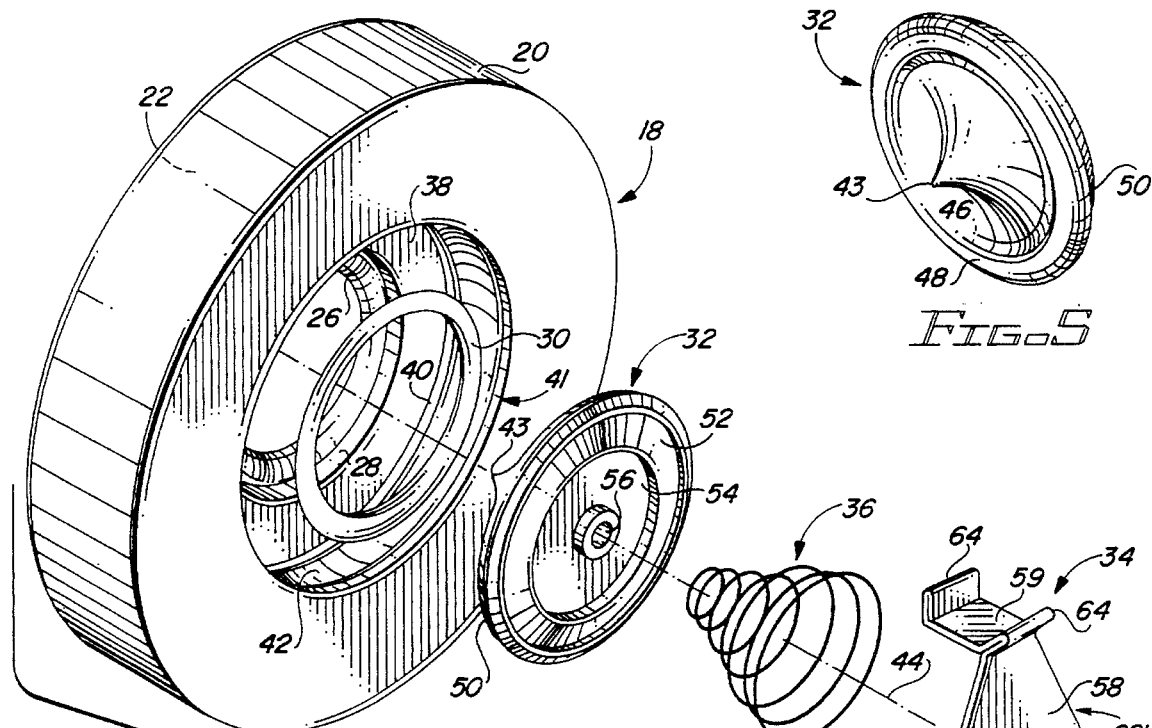
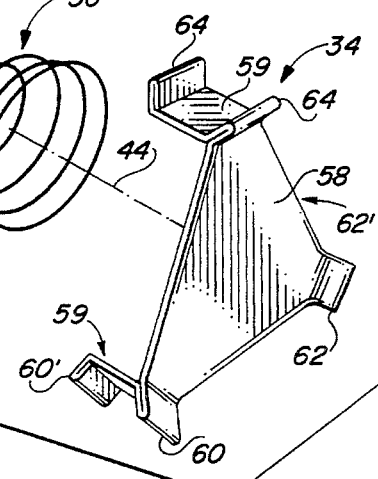
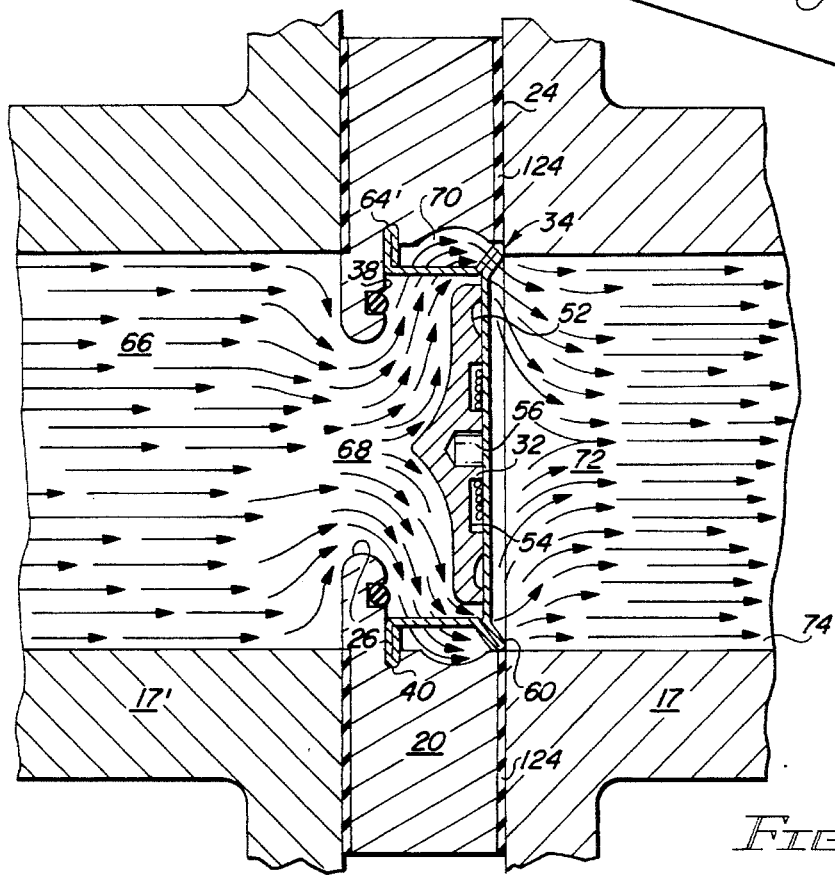

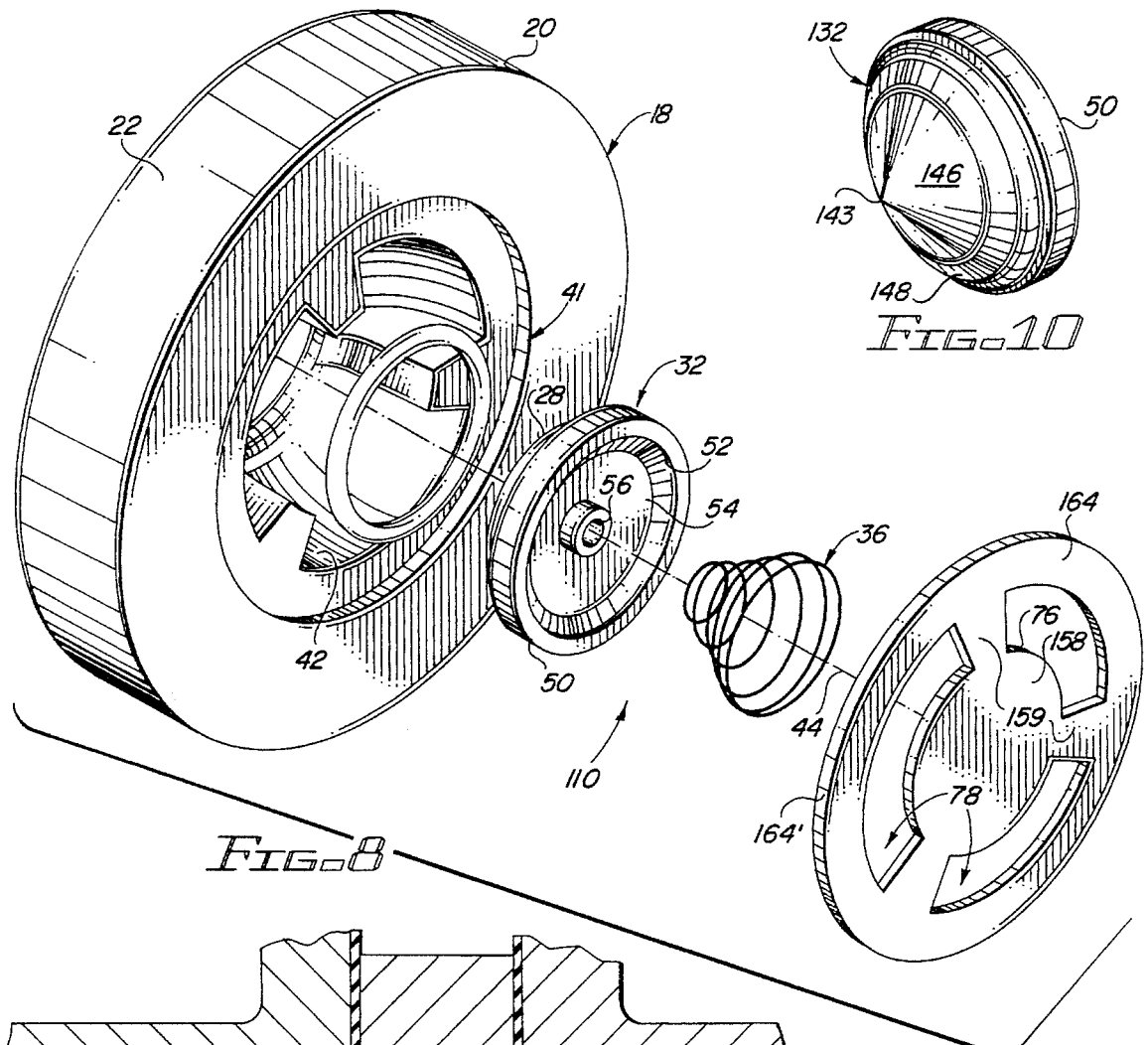
FIG.-8
FIG.-10
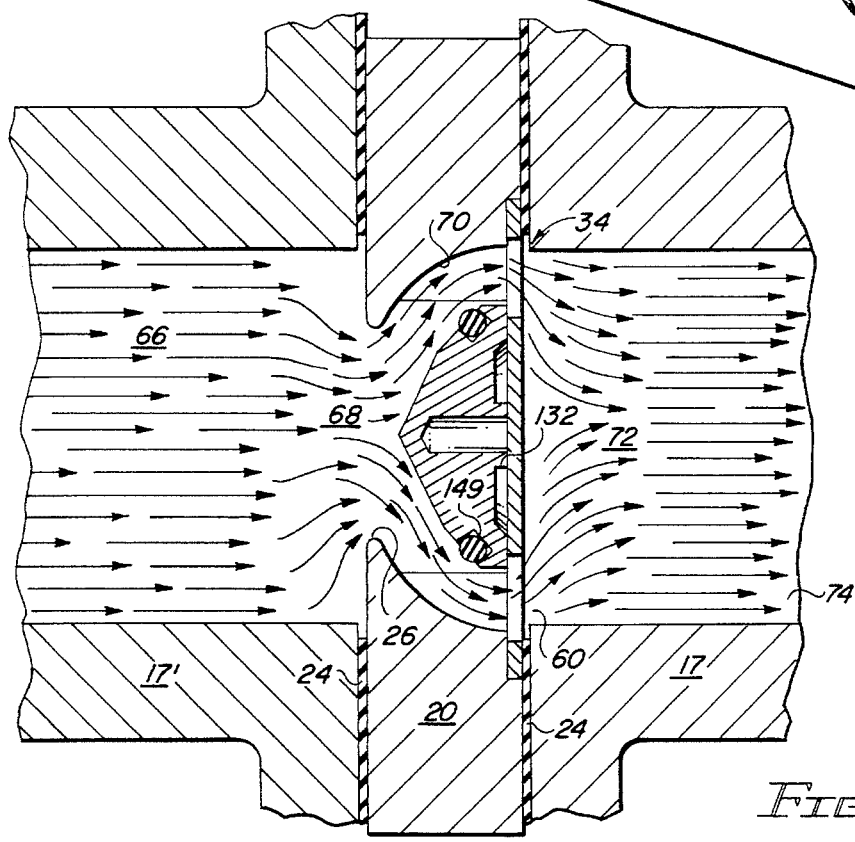
FIG.-11

5,469,884

CHECK VALVE FOR METER RUN

DESCRIPTION OF THE PRIOR ART

Applicant's prior art statement sets forth various prior art subject matter of which this invention is an improvement thereover.

BACKGROUND OF THE INVENTION

In recent years natural gas has progressively increased in importance and has become a primary heating fuel that continues to gain in prominence in the transportation industry and, to a less extent, for fueling automobiles and busses. This has caused natural gas to increase in cost and become important as fuel. Therefore, there is a need for accurate measurement for sales purposes domestically as well as in other areas of the world.

Natural gas is produced from drilled oil wells and gas wells. The gas production formations are located deep within the earth in huge caverns or sometimes in solution in an oil reservoir. The gas is produced from a wellhead located at the earth's surface, and it is measured by a metering device or meter run as it flows into a pipeline where it is transported into a gas processing plant and is cleaned and processed, with the residue being distributed to the user market as sales gas.

During the above events, the gas is measured at various places to insure accurate sales data. This is achieved by a meter run having a charting instrument that shows the amount of flow for any given time period. Hence, the gas usually is measured many times as it flows from the wellhead to the user market.

There is always a possibility that gas will back-flow in a downstream direction and travel back through the metering device due to reversal of gas pressure for one reason or another. After this problem has been remedied, the gas resumes flow and often it is measured by the metering device a second time, causing someone to pay twice for the same volume of gas.

This problem is remedied by a check valve apparatus that is placed at the immediate downstream side of the meter run, in accordance with the present invention.

SUMMARY OF THE INVENTION

This specification sets forth the precise invention for which a patent is solicited, in such manner as to distinguish it from other inventions and from what is old. This invention comprehends a fluid check valve for preventing back flow of fluid through a fluid conduit. The check valve preferably is arranged in series relationship respective to fluid flowing through a meter run to enable unrestricted normal flow to occur, and prevents backflow therethrough. The check valve has a main body through which an annular passageway is formed. A caged valve element is mounted within the annular passageway. The annular passageway includes a throat, a working chamber, and an outlet.

The throat has a relatively small diameter that enlarges into the working chamber and results in the formation of a lip upstream thereof. The lip has opposed walls with an outer wall thereof coinciding with the upstream face, and the inner wall thereof is arranged parallel to the outer wall. The inner wall enlarges outwardly and radially into a circumferentially extending slot having an outside diameter greater than the diameter of the working chamber.

An annular seat is formed on the inner wall of the lip and within the passageway for receiving the valve element in seated relationship therewith, and thereby prevents backflow of fluid therethrough.

A valve cage loosely captures the valve element for axial movement within said working chamber whereby the valve element moves axially toward and away from the seat so that during normal flow the valve element is spaced from the valve seat, and should any significant backflow commence, the valve element sealingly engages the valve seat to prevent the occurrence of such backflow.

In the first embodiment of the invention, the cage has a main central body part to which there is integrally attached a plurality of radially extending legs that include spaced tabs formed thereon for attachment into the circumferentially extending locking groove.

In a second embodiment of this invention a valve cage is mounted downstream of the working chamber and supported at the outlet. The valve element is biased upstream so that it is moved into a closed position should the flow condition become unduly low such that a backflow condition is anticipated.

Accordingly, a primary object of the present invention is the provision of improvements in a fluid check valve for preventing backflow of fluid through a fluid conduit.

Another object of the invention is to provide a check valve apparatus that is arranged in series relationship respective to fluid flow through a meter run and thereby enable unrestricted normal flow to occur through said check valve, and additionally to prevent backflow therethrough, thereby assuring that the meter run measures only one quantity of fluid flowing therethrough should circumstances arise where backflow could otherwise occur through the meter run.

A further object of this invention is to disclose and provide a fluid check valve for preventing backflow of liquid and gas through a fluid conveying conduit, comprising a check valve apparatus mounted with respect to a fluid conduit to enable flow to occur in only a downstream direction therethrough; and wherein said check valve has a main body, within which an annular passageway is formed through which flow can occur through said main body, and wherein the annular passageway includes a throat, a working chamber, and an outlet, all arranged in a new and unobvious manner to provide a new combination of elements for flow control apparatus.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described herein.

BRIEF DESCRIPTION OF THE DRAWINGS

FIG. 3 is an exploded, perspective view of apparatus made in accordance with this invention;

FIG. 5 sets forth an isolated, perspective view of part of the apparatus disclosed in the forgoing figures;

FIG. 6 is a hypothetical, longitudinal cross-sectional view showing the flow characteristics of the apparatus of FIGS. 2, 3, 4 and 5;

FIG. 8 is an exploded, perspective view of apparatus made in accordance with the embodiment of FIG. 7;

FIG. 10 is an isolated, perspective view of another part of the apparatus disclosed in FIGS. 7 and 8; and, FIG. 11 is a hypothetical, longitudinal cross-sectional view showing the flow characteristics of fluid flowing through the apparatus of FIGS. 7, 8, 9 and 10.

DETAILED DESCRIPTION OF THE PREFERRED EMBODIMENTS

Figure 1:
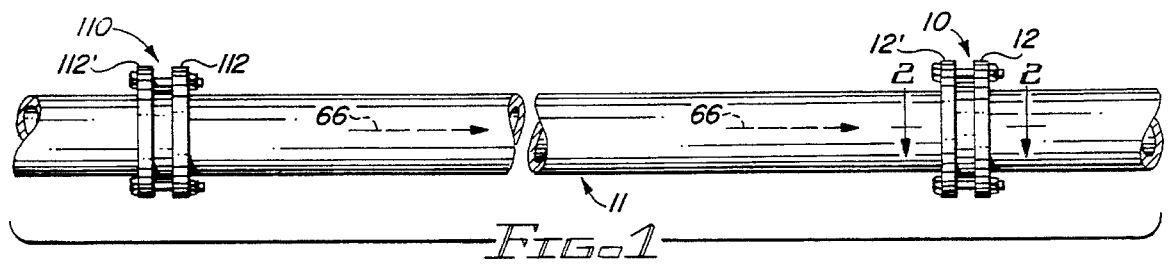
FIG. 1 is an elevational view of a meter run having apparatus made in accordance with this invention associated therewith.

The Figures of the drawings disclose a novel fluid check valve, made in accordance with this invention, for preventing backflow of fluid through a fluid conduit. In FIG. 1, a fluid check valve 10, of the present invention, is disclosed for preventing backflow of fluid through a meter run 110 in a fluid conduit 11 shown disclosed as having the usual orifice plate arrangement compressed between confronting flanges 112, 112'.

Figure 2:
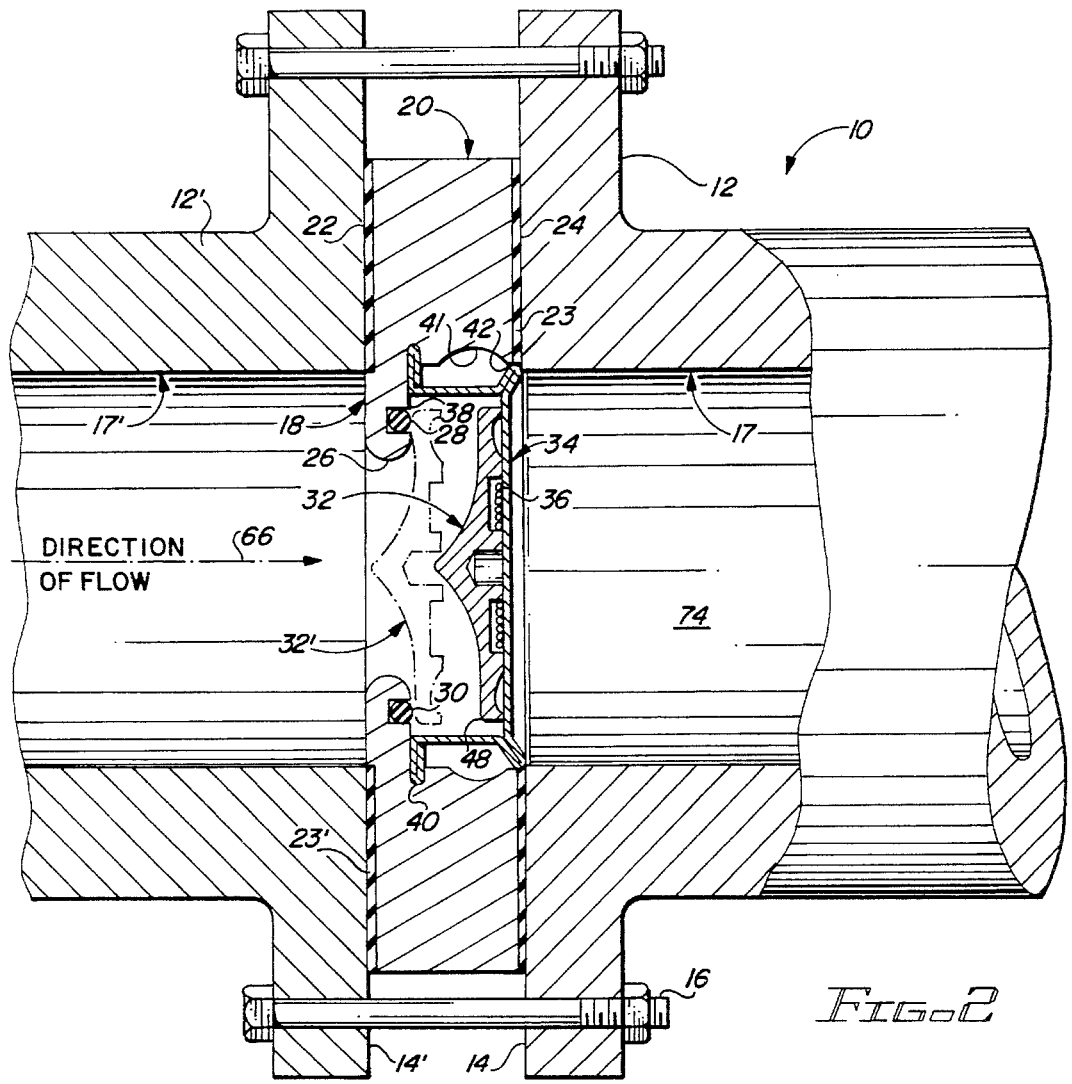
FIG. 2 is an enlarged, part cross-sectional view taken along line 2—2 of FIG. 1, and showing further details of the apparatus of this invention.

FIG. 2, together with other figures of the drawings, disclose a first embodiment 10 of this invention having mounting means 12, 12' in the form of commercially available confronting flanges that present confronting flange faces 14, 14' to mount said check valve 10 therebetween respective to a fluid conduit 11 and thereby enable unidirectional flow to occur therethrough easily. Tension bolts 16 compress the flanges 12, 12' towards one another and properly mount the main body 18 of the check valve 10 concentrically with respect to the interior of the flow conduits 17, 17'.

The invention 10 comprises the before mentioned main body member 18, which preferably is of annular construction, and has a cylindrical outer surface 20, and an upstream annular face 22 opposed to a downstream annular face 23. A passageway extends more or less axially through said main body 18, through which substantially unrestricted flow can occur in a downstream direction, and through which reverse or backflow cannot occur due to the check valve characteristics of the invention. Gasket 24, 24' is interposed between faces 14, 23, and faces 14', 22.

As seen in FIGS. 2, 3 and 6, the central or axial passageway commences at a throat 26 which receives flow from upstream conduit 17'. Seal means 28, 30 provide a stationary valve seat for sealingly receiving a movable valve element 32 thereagainst. The valve element 32, the details of which are more fully set forth in FIG. 5, is of special configuration and made in accordance with this invention. For purposes of illustration, the seal means 28, 30 are illustrated in the form of an O-ring groove 28 within which an O-ring 30 is removably received.

Figure 4:
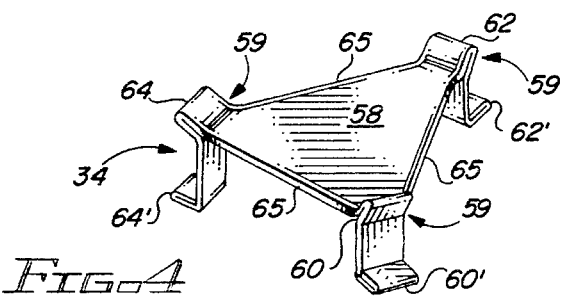
FIG. 4 is an isolated, perspective view of part of the apparatus disclosed in some of the forgoing figures.

As seen in FIG. 2, together with FIGS. 3, 4 and 6, valve cage 34 captures the before mentioned valve element 32 therewithin for movement within an operating area defined by the seat 28, 30 (located behind the throat 26) and the downstream end of cage 34. Further, a biasing means, the details of which will be more fully described later on herein, is shown herein as a valve spring 36 which urges the valve element 36 in an upstream direction. The details of the valve element 32 are more fully set forth in FIG. 5.

The axial passageway commences at annular wall surface 38, which is spaced from and parallel to upstream and downstream annular wall surfaces presented by main body opposed faces 22, 23. The wall surface 38 extends radially outwardly to define a circumferentially extending locking groove 40 for mounting the before mentioned cage 34 thereto in the illustrated manner of FIG. 2. Downstream of the locking groove 40, it will be noted that the axial passageway enlarges in the manner indicated by the arrow at numeral 41, and terminates in edge portion 42 adjacent the downstream flange face 23. Edge 42, together with the before mentioned locking groove 40, forms a unique mount means for securing the before mentioned cage 34 in captured relationship within the axial passageway in the illustrated manner of FIG. 2. The details of the cage will be more fully described later on herein.

Looking now to the details of FIG. 5, together with FIGS. 2, 3 and 4, wherein the valve element 32 is seen to have an apex 43 that coincides with a central longitudinal axis 44 of main body member 18, the valve element 32, the cage 34, and any flow conduit 17, 17' to which the check valve 10 may be attached.

A conical surface 46 is not a true cone, noting that it curves or slopes from apex 43 into a circumferentially extending seal surface at 48, with surface 48 being arranged complementary respective to seal means 28, 30 and thereby sealingly engages valve seat 30 (shown as an o-ring). Numeral 50 indicates the outermost peripheral edge of valve element 32, which is of less diameter than the passageway at 41, and is considerably greater respective to the diameter of the throat 26.

Still looking at FIGS. 2, 3, 4 and 5, and in particular to FIG. 3, a recess 52 forms a lightening hole adjacent to the peripheral edge 50. An annular spring receiving cavity 54 is concentrically arranged between blind hole 56 and recess 52, and is located concentrically and intermediate respective thereto and to the blind hole 56. The lightening hole, together with the configuration of the conical surface 46, and the configuration of the passageway, including the throat 26, imparts unusual and desirable flow characteristics into the check valve apparatus, as shown in FIG. 6.

In FIG. 4, together with FIGS. 2 and 3, cage 34 is seen to have a main central body part 58 to which there is integrally attached a plurality of radially extending legs 59. The legs 59 radiate from the central body part 58 as best seen at 60, 62, and 64 in FIGS. 3 and 4. Marginal lengths of the legs at 60, 62 and 64 and 60', 62' and 64' receive a double bend that result in the formation of spaced tabs having a double thickness of metal for increasing the structural integrity thereof and at the same time providing a spring-like characteristic thereto. This enhances attachment of tabs 60, 62, 64 into the circumferentially extending locking groove 40, and the attachment of tabs 60', 62', 64' into the groove formed between edge portion 42 of face 23 of main body 18, and face 14 of flange 12.

The multi-legged resultant structure 34, as best seen illustrated in FIGS. 2, 3 and 4, has three U-shaped legs 59 circumferentially spaced from one another, with each leg having upstream sets of tabs 60', 62', 64' spaced from downstream sets of tabs at 60, 62, 64. The legs are attached to central part 58 thereof and radially depend therefrom such that the spaced tabs on the radially extending legs 59 are concurrently received within locking groove 40 and abuttingly engage edge portion 43 and 60, respectively, of faces 23 and 14, respectively, of the main body and flange.

The upstream set of tabs are received within groove 40 while the downstream set of tabs are received against the edge of the flange. As the upstream set of tabs are forced into groove 40, the double bend acts as a spring due to the memory of the metal. Accordingly, should an unusually high pressure drop occur across the valve element and cage, the downstream tabs will be forced further into the space provided for gasket 24 and between confronting faces 14, 23.

This unexpected result firmly anchors the cage within the main body due to its deformation as it is forced a small distance downstream, and thereby provides an indication that parts of the meter run, including the check valve 10, may have been over-stressed.

In FIG. 4, numeral 65 indicates the outer edge of the surface of the central body part 58 about which flow can occur. Outer edge 65 is spaced from the inner surface 41 of the passageway (FIGS. 2 and 3) and account in part for the illustrated unexpected and unforseen desirable low-loss pattern suggested in FIG. 6. Consequently, the pressure drop across the back flow check valve 18 of this invention is unexpectedly low for normal flow, which is in the direction indicated by the arrow at numeral 66 of FIG. 2, and conversely is maximum for backflow, ie: when backflow occurs, the check valve element 32 seats against seal means 28, 30 and there is no backflow when the valve element is seated as suggested by the dot-dash indication at numeral 32' of FIG. 2, for example.

The unexpected and useful improved flow characteristics of a fluid flowing through a check valve apparatus made in accordance with the present invention is illustrated in FIG. 6. In FIG. 8 it is noted that upstream flow at 66 is reduced in diameter at 68 as flow is forced through reduced diameter throat 26, and thereafter encounters the increased diameter as flow proceeds through the working chamber and toward the open valve element 32, whereupon the flow assumes the illustrated desirable flow pattern at 70 as it continues downstream and about the valve element 32 which is especially contoured to achieve this flow pattern. The flow continues through cage 34, and exits or discharges into the downstream part 74 as seen at 72. The cage 34 is not apertured at 58 because at normal flow rates such an aperture is covered by the valve element 32.

The disk shape has been optimized, using finite element analysis methods, to promote the illustrated smooth transition into the valve body and then to pull the fluid back to a more central location to discharge the fluid from the valve. A comprehensive F.E.A. testing and optimization is reflected in the valve element and body in order to provide a superior disc valve within the context of "wafer check" valve configuration according to A.P.I. specifications and ANSI class standards.

Throughout this disclosure, wherever it is logical or reasonable to do so, like or similar numerals refer to like or similar parts or elements.

The second embodiment of this invention is set forth in FIGS. 7, 8, 9, 10 and 11, wherein the central or axial passageway commences at throat 26, which receives flow from upstream conduit 17'. A seal means 49, 148 is mounted on a valve element 132, which, as best seen illustrated in FIG. 10, is of special configuration and made in accordance with the second embodiment of this invention. For purposes of illustration, the seal means 49, 148, is illustrated in the form of a circumferentially extending groove 49 within which a complementary configured annular resilient seal ring 148 is received for sealingly engaging the illustrated valve seat 128 formed behind throat 26. For clarity, the spring 36 is not shown in FIGS. 7 and 11.

A valve cage 134, together with seat 128, captures the before mentioned valve element 132 for movement therebetween, and further includes a biasing means therefor (shown in FIG. 8 as a valve spring 36). The details of cage 134 and valve element 132 are more fully described in conjunction with FIGS. 9 and 10 later on herein.

Figure 7:
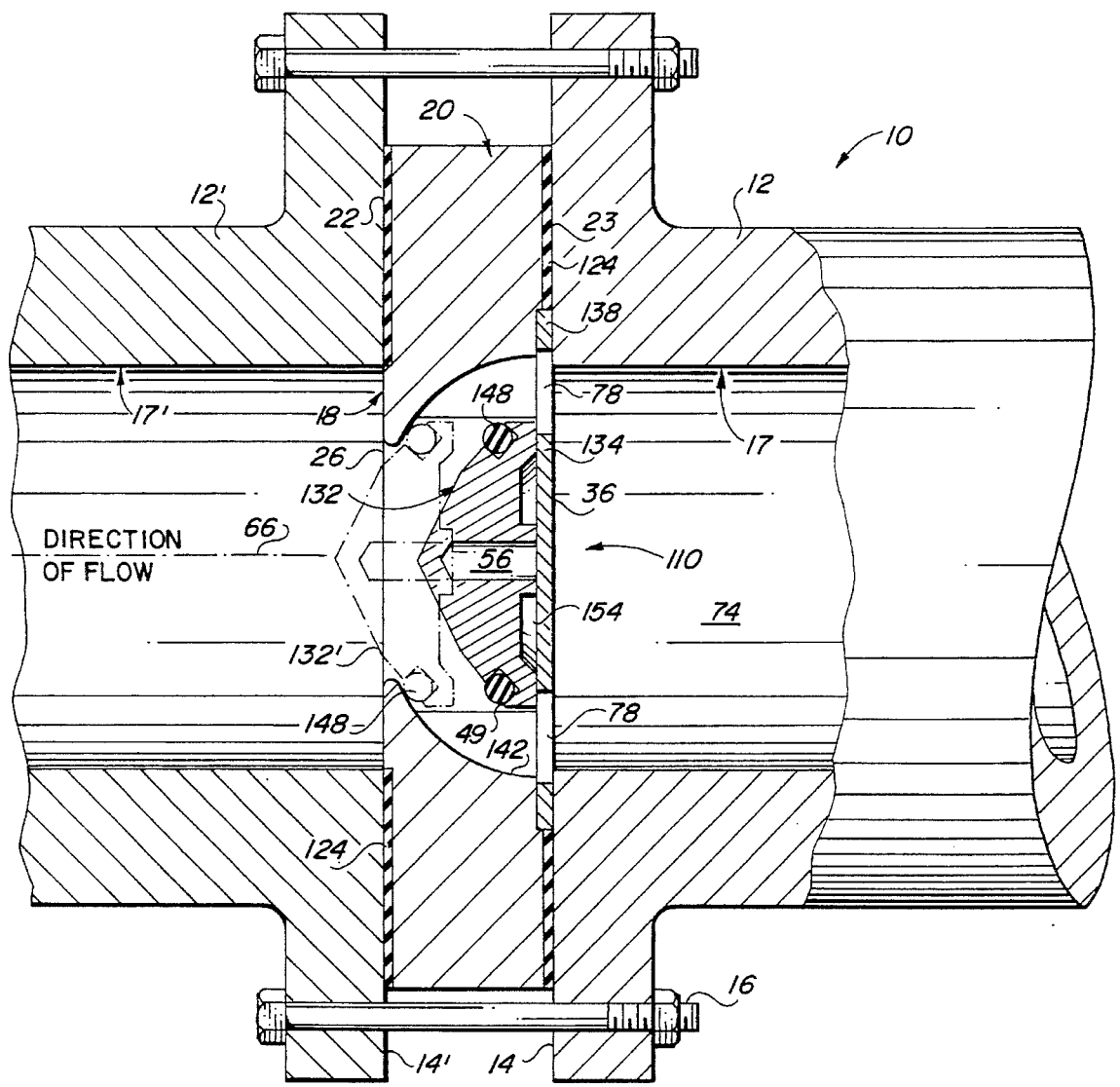
FIG. 7 is an enlarged, part cross-sectional view taken along line 2—2 of FIG. 1, and showing details of an alternate embodiment of this invention.

The downstream wall surface 24 is undercut to form part of a circumferentially extending locking groove 138 for mounting the outer rim of valve cage 134 therein in the illustrated manner of FIG. 7 and 11. The annular wall surface 138 is spaced from and parallel to annular wall surfaces 14 and 24.

Upstream of the locking groove 138, it will be noted that the axial passageway decreases in diameter in the manner indicated by the arrow at numeral 142, and terminates in throat 26 at the upstream face 22.

Looking now to the details of FIG. 10, together with FIGS. 7–9, and 11, wherein the valve element 132 is seen to have an apex 143 that coincides with a central longitudinal axis 44 of main body member 118, valve element 132, valve cage 134, and flow conduit 17, 17' to which the check valve may be attached. A conical surface 146 is not a true cone, noting that it curves from apex 143 into a circumferentially extending seal surface at 148 which is arranged complementary respective to seat 148 and thereby enable sealing engagement between valve seat 128 and seal means 149, shown as a formed annular resilient gasket 148 on valve element 132. Numeral 50 indicates the outermost peripheral edge of valve element 132, which is of less diameter than the passageway at 142, and is considerably greater respective to the diameter of throat 26.

In FIGS. 7, 8, 9, 10 and 11, a recess 52 forms a lightening hole adjacent to the peripheral edge 50. An annular spring receiving cavity 54 is concentrically arranged between blind hole 56 and peripheral edge 50, and is located concentrically and intermediate respective thereto and to the blind hole 56.

The lightening hole, together with the configuration of the conical surface 146, and the configuration of the axial passageway, imparts unusual flow characteristics into the check valve apparatus 110.

Figure 9:
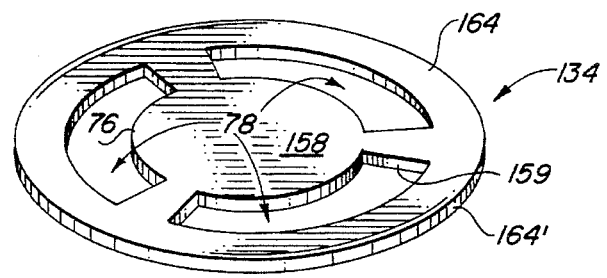
FIG. 9 is an isolated, perspective view of part of the apparatus disclosed in FIGS. 7 and 8.

In FIG. 9, together with FIGS. 7 and 8, the cage 134 has a main central body part 158 to which there is attached a plurality of radially extending legs 159. The legs 159 radiate from the central body part 158 into attached relationship respective to rim 164, leaving openings 78 between the central body part 158 and the rim 164. The rim 164, as best seen in FIG. 7, is received within the circumferentially extending locking groove 138 located between flange face 14 and the downstream face 24 of the main body 118.

In FIG. 9, numeral 164' indicates the outer edge of the surface of rim 164. The central body part 158 has edges 76 spaced from rim 164 to form the illustrated circumferentially spaced flow passageways 78 through which flow can occur.

The present invention provides an improved check valve apparatus that is arranged in series relationship respective to fluid flow through a fluid conduit or meter run, and enables unrestricted normal flow to occur through said check valve with little pressure drop thereacross, and additionally prevents backflow therethrough in a new and unobvious manner.

I claim:

1. A check valve for preventing back flow of fluid through a fluid conduit, comprising;

a main body having opposed parallel upstream and downstream faces; said main body having an annular passageway through which flow can occur therethrough, means mounting said main body respective to a fluid conduit to enable flow to occur therethrough; said annular passageway includes a throat forming an inlet thereinto, a working chamber, and an outlet;

said throat is of relatively small diameter and forms an entrance into said annular passageway at said upstream face, where the passageway enlarges into said working chamber which forms a circumferentially extending lip upstream thereof; said lip having opposed walls with an outer wall thereof coinciding with said upstream face and said opposed wall being arranged parallel to said outer wall; said opposed wall enlarges radially into a slot having an outside diameter greater than the diameter of said working chamber;

a valve element having a diameter greater than said throat, an annular seat formed on said lip downstream of said throat and within said annular passageway for receiving said valve element in seated relationship thereon, and thereby prevent back flow of fluid through said passageway;

a valve cage by which said valve element is mounted for axial movement within said working chamber, said valve cage having legs releasably received within said slot whereby said valve element is moved toward and away from said seat in response to pressure differential thereacross such that said valve element can move from an open to a closed position to engage said seat to prevent back flow through said check valve.

2. The check valve of claim 1 wherein said seat is an annular resilient seal means received within a groove located adjacent said lip and within said working chamber and arranged in spaced relationship respective to said throat and said circumferentially extending slot.

3. The fluid check valve of claim 2 wherein said cage is in the form of a spider having a central body part from which a plurality of said legs radiate; said legs each having outer marginal ends bent into a U-shaped configuration in longitudinal cross-section to present spaced tabs that are received into said slot to thereby releasably lock said cage within said annular flow passageway.

4. The fluid check valve of claim 3 wherein there is a coiled spring having opposed ends, respectively, that bear against said central body part and said valve element, respectively, and thereby urge said element against said seat.

5. The fluid check valve of claim 3 wherein said legs each have spaced tabs, with one tab thereof being adjacent said central body part and engaging a circumferential edge presented at the downstream face and the other said tab being the recited tab that is received within said slot, whereby, should an undue downstream directed force be applied to said cage, said one tab becomes deformed and thereby provides visual evidence of the applied force.

6. The fluid check valve of claim 1 wherein said valve element has a central longitudinal axis that coincides with a central longitudinal axis of said main body passageway;

said valve element includes a conical face having an apex intersected by said central longitudinal axis of said main body passageway; means on the marginal edge portion of said conical face for sealingly engaging said seat;

an annular spring receiving cavity located on the rear face of said valve element and concentrically arranged respective to said conical face; whereby pressure differential across said valve element can cause said valve element to be urged against said valve cage with said spring being compressed into said spring receiving cavity while fluid flow occurs through a space defined by the inside diameter of the passageway and the periphery of the valve element.

7. A check valve for controlling back flow of fluid through a meter run, comprising:

a valve body having an upstream face opposed to a downstream face, an annular passageway formed through said valve body and extending through the recited opposed faces;

a throat defines an opening into said passageway and includes an inwardly extending annular lip integral with said valve body and having a outer wall surface that coincides with said upstream valve body face and a rear wall surface that terminates in a circumferentially extending groove; said groove having a relatively large diameter respective to said throat which has a relatively small diameter;

a working chamber located between said throat and said downstream face having an inside diameter of a value intermediate the diameter of said groove and said throat; a valve element received within said chamber;

means forming a seat on said rear wall surface against which said valve element is seated in spaced relation respective to said throat and said circumferentially extending groove;

a cage in the form of a spider having a central body with a plurality of legs extending therefrom, each leg is bent into a configuration that includes outwardly extending spaced tabs, said tabs are received within said groove to removably mount said spider within said passageway;

said valve element is captured within said cage and has a front and a back; and biasing means between the spider central body and the back of the valve element.

8. The fluid check valve of claim 7 wherein said seat is a resilient seal means received within a groove located within said working chamber and arranged in spaced relationship respective to said throat and said circumferentially extending groove; and, said working chamber has an inner wall surface that increases in diameter in a downstream direction and terminates in a circumferential edge at said downstream face.

9. The fluid check valve of claim 8 wherein said spider legs each having outer marginal ends bent into a U-shaped configuration in longitudinal cross-section to present a second tab spaced from the first recited tab with said second tab thereof having a surface engaging said edge at the downstream face and the other said tab being received into said circumferentially extending slot to thereby releasably lock said cage within said annular flow passageway.

10. The fluid check valve of claim 9 wherein said biasing means is a coiled spring having opposed ends, respectively, that bear against said valve element and said central body of said cage, respectively, and thereby urge said element against said seat.

11. The fluid check valve of claim 7 wherein said valve element has a central longitudinal axis that coincides with a central longitudinal axis of said valve body passageway;

said valve element includes a conical face having an apex intersected by said central longitudinal axis of said valve body passageway; means on the marginal edge portion of said conical face for sealingly engaging said seat;

an annular spring receiving cavity located on the rear face of said valve element and concentrically arranged respective to said apex; whereby pressure differential across said valve element urges said valve element against said spider central body part with said spring being compressed into said spring receiving cavity while fluid flow occurs through a space defined by the inside diameter of the passageway and the outer periphery of the valve element.

* * * * *